(12) United States Patent
Landberg

(10) Patent No.: US 8,246,293 B2
(45) Date of Patent: Aug. 21, 2012

(54) SUBMERSIBLE PLANT

(75) Inventor: Magnus Landberg, Linköping (SE)

(73) Assignee: Minesto AB, Västra Frölunda (SE)

( * ) Notice: Subject to any disclaimer, the term of this patent is extended or adjusted under 35 U.S.C. 154(b) by 800 days.

(21) Appl. No.: 12/162,980

(22) PCT Filed: Jan. 31, 2007

(86) PCT No.: PCT/EP2007/050924
§ 371 (c)(1), (2), (4) Date: Dec. 4, 2008

(87) PCT Pub. No.: WO2007/101756
PCT Pub. Date: Sep. 13, 2007

(65) Prior Publication Data
US 2009/0185904 A1    Jul. 23, 2009

(30) Foreign Application Priority Data

Feb. 2, 2006 (EP) .................................. 06101208

(51) Int. Cl.
*F03B 13/12* (2006.01)
(52) U.S. Cl. .......................................... 415/3.1; 290/42
(58) Field of Classification Search .............. 415/3.1, 415/7, 8, 906; 416/84.85; 290/42, 43, 53, 290/54
See application file for complete search history.

(56) References Cited

U.S. PATENT DOCUMENTS

| 4,383,182 | A | | 5/1983 | Bowley | |
|---|---|---|---|---|---|
| 4,737,070 | A | * | 4/1988 | Horiuchi et al. | 415/7 |
| 6,091,161 | A | * | 7/2000 | Dehlsen et al. | 290/43 |
| 6,531,788 | B2 | * | 3/2003 | Robson | 290/43 |
| 6,982,498 | B2 | * | 1/2006 | Tharp | 290/54 |
| 7,105,942 | B2 | * | 9/2006 | Henriksen | 290/55 |
| 7,944,073 | B2 | * | 5/2011 | Van Drentham Susman et al. | 290/54 |
| 2002/0197148 | A1 | * | 12/2002 | Belinsky | 415/2.1 |
| 2009/0226296 | A1 | * | 9/2009 | Bibeau et al. | 415/1 |
| 2011/0012369 | A1 | * | 1/2011 | Grossman | 290/1 R |

FOREIGN PATENT DOCUMENTS

| GB | 2256011 A | 11/1992 |
|---|---|---|
| GB | 2410299 A | 7/2005 |

OTHER PUBLICATIONS

International Search Report and Written Opinion mailed Jun. 5, 2007, for PCT Application No. PCT/EP2007/050924 filed Jan. 31, 2007, 9 pages.

* cited by examiner

*Primary Examiner* — S. V. Clark
(74) *Attorney, Agent, or Firm* — Morrison & Foerster LLP

(57) ABSTRACT

The present invention relates to a submersible plant for producing energy. The submersible plant comprises at least one turbine (9) and is characterized in that said turbine (9) is mounted on a stream-driven vehicle (3) and in that said stream-driven vehicle is secured in a structure by means of at least one wire (6).

11 Claims, 5 Drawing Sheets

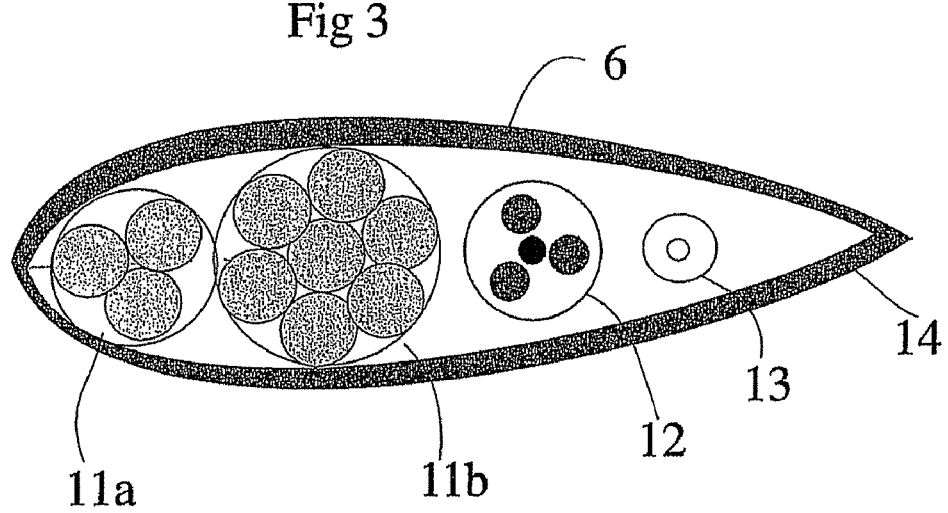

SUBMERSIBLE PLANT

CROSS REFERENCE TO RELATED APPLICATIONS

This is a U.S. National Phase of PCT/EP2007/050924, filed Jan. 31, 2007, which claims priority to European Application No. 06101208.4, filed Feb. 2, 2006, both of which are hereby incorporated by reference in the present disclosure in their entirety.

TECHNICAL AREA

The present invention relates to a submersible plant for producing energy comprising at least one turbine.

DESCRIPTION OF PRIOR ART

One of the main global problems to be solved is how to supply energy to the population of the world. The use of fossil fuels has to be decreased and substituted with renewable sources of energy.

A significant percentage of the efforts to use renewable sources of energy have been concentrated on wind powered systems. The wind powered generating systems have a problem in that wind energy is inherently intermittent.

There exist today submersible plants for producing electricity from ocean currents. Those plants are fastened in the sea bottom by means of wires and comprise turbines arranged to be driven by tidal water.

However, the power generated from the submersible plants needs to be increased without substantially increasing the costs in order to be commercially attractive.

DESCRIPTION OF THE INVENTION

One object to the invention is to increase the power output from submersible plants.

This has been achieved by means of a submersible plant for producing energy comprising at least one turbine and characterized in that said turbine is mounted on a stream-driven vehicle and in that said stream-driven vehicle is secured in a structure by means of at least one wire. The structure can be stationary, such as a mooring at the bottom of a sea, river, lake etc or a wind power plant or stationary submersible plant located in a sea or lake. The structure can also be movable, such as a ship.

The vehicle of the plant according to the present invention moves with a velocity which is many times (characteristically between 10-20 times) higher than the streaming velocity of the water. Thereby, the efficiency of the on board turbine arrangement is much higher than the efficiency of a stationary rotor arrangement.

The plant is preferably mounted in environments with well-defined, predictable streams with regard to direction and velocity such as in rivers, in tide affected areas and in ocean streams.

The plant in accordance of the invention enables environment friendly, rational and cost effective generation of energy, for example electrical energy, from relatively weak ocean currents and tide streams on cites close to the coast. The plant in accordance with the present invention can also be used offshore at relatively large depths, where few competing techniques are available.

In accordance with one preferred embodiment of the present invention the stream driven vehicle is a wing, ie a lifting body.

The vehicle is in accordance with another preferred embodiment substantially free swiveling at least in a pitch direction. The vehicle adapts to an optimum working point in the pitch direction. The vehicle is preferably also free swiveling in a roll direction in relation to the turbine. Thereby the turbine will face the relative stream direction, ie the water stream will be forced upon the turbine from a direction perpendicular to a plane defined by the turbine blades.

In one preferred embodiment wherein the vehicle is free swiveling in accordance with the above, at least one of the turbines is mounted on the vehicle via a rod and a swivel coupling is mounted at one end of the rod for pivotally connecting either the turbine or the vehicle to the rod. The swivel coupling comprises for example a universal bearing.

In another preferred embodiment wherein the vehicle is free swiveling in accordance with the above, at least one of the turbines is directly mounted on the vehicle by means of a swivel coupling.

In yet another preferred embodiment of the invention the stream-driven vehicle is provided with steering means and a control unit is arranged to provide control signals to the steering means for steering the vehicle in a predetermined trajectory. The steering means can then include one or more control surfaces.

Further, the wire will preferably be stretched and accordingly the predetermined trajectory is formed in a spherical surface. In order to provide the stream-driving, the predetermined trajectory will at least partly cross the stream-direction.

In accordance with one embodiment of the invention, the turbine is operatively connected to a generator arranged to produce electrical energy. The generator can be operatively connected to an electrical cable arranged to distribute said electrical energy. The electrical cable is for example at least partly integrated in the wire. However, if an electrical cable connecting to the vehicle is not desirable, the produced electrical energy can for example be used for electrolyzing the water and production of hydrogen gas directly at the vehicle.

BRIEF DESCRIPTION OF FIGURES

FIG. 2 shows a first example of a stream driven vehicle of the submersible plant of FIG. 1.

FIG. 3 shows in cross-section an example of a wire of the submersible plant of FIG. 1.

PREFERRED EMBODIMENTS

Figure 1A:
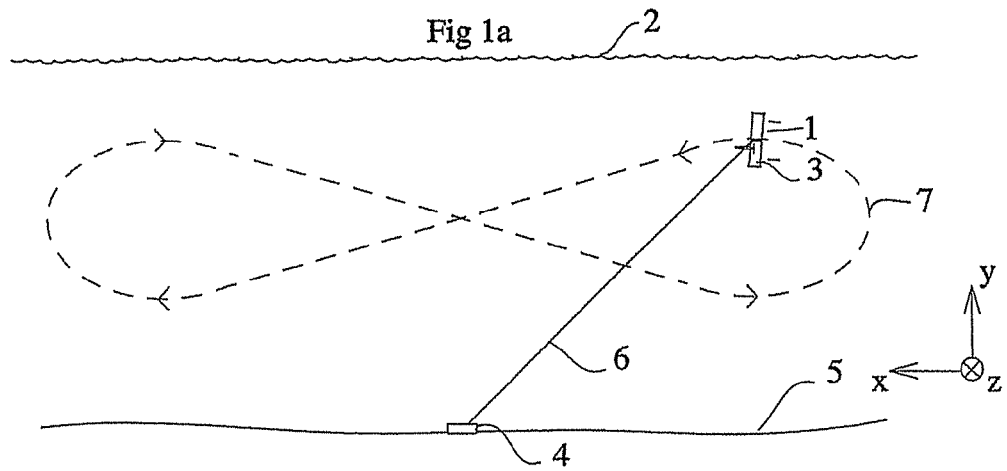
FIG. 1a shows an example of a submersible plant arrangement in accordance with a first example of the invention in a xy-plane, wherein x denotes a horizontal direction perpendicular to the stream direction and y denotes the vertical direction.
Figure 1B:
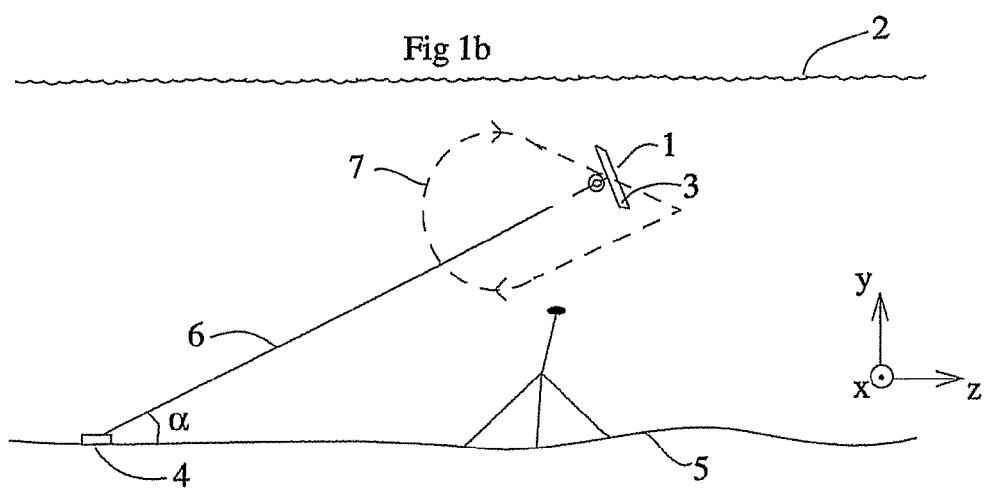
FIG. 1b shows the submersible plant arrangement of FIG. 1a in a yz-plane, wherein z denotes a horizontal stream direction.
Figure 1C:
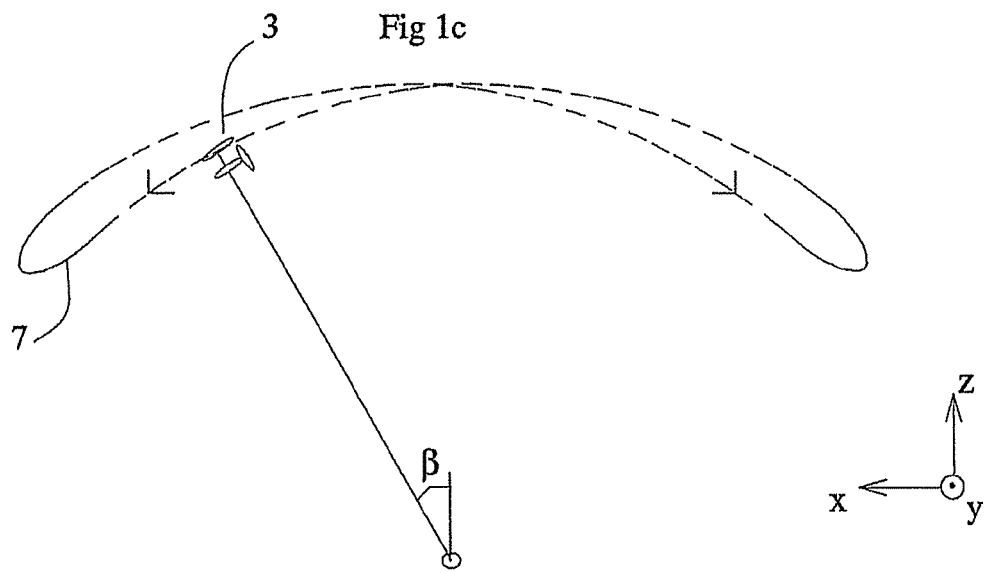
FIG. 1c shows the submersible plant arrangement of FIG. 1a in a xz-plane.

In FIGS. 1a, 1b and 1c, a submersible plant 1 is arranged under the water surface 2 of for example the sea. The plant 1 comprises a stream-driven vehicle 3 secured in a mooring 4 at the bottom 5 of the sea by means of a wire 6. The length of the wire 6 is for example 50-200 meters. In FIG. 1a, z defines the horizontal stream direction, x a horizontal direction perpendicular to the stream direction and y defines the vertical direction. The vehicle can move freely within a range of the wire. However, in FIGS. 1a, 1b and 1c, the vehicle follows a never-ending trajectory 7 formed as the digit eight in a spherical surface with a bending radius equal to the length of the wire. The trajectory is preferably chosen such that the vehicle is always is beneath the sea surface. For example, the trajectory can be chosen such that the wire always ends 10-20 meters beneath the sea surface. Thereby the vehicle is not subjected to the turbulences usually present close to the surface and the risk of turbine cavitation can be minimized. The advantage of having a trajectory formed as the digit eight is that then the wire will not be twisted and accordingly, there is no need for connecting the wire 6 to the mooring 4 by means of a swiveling device In FIG. 2 the stream-driven vehicle 3 is a wing, ie a lifting body. The wing has for example a wing span s of about 15 meters and a width (cord) c which is for example 2-3 meters. The thickness of the wing may be 10-20% of the width. The wing is preferably formed by a spar supporting a surface structure. The spar is in one example made of a carbon fibre composite material. The surface structure is for example made of a glass fibre composite material.

A turbine arrangement 9, in the illustrated embodiment comprising one turbine, is mounted to the vehicle structure by means of a rod 10. The turbine 9 and rod 10 can be made of a metal or compound of metals, for example stainless steal. In one example, the turbine 9 has adjustable blades and in another example, the blades of the turbine 9 are fixedly mounted. The diameter of the turbine is for example 1 to 1.5 meters. The wire is secured in the turbine 9. The turbine 9 is operatively connected to a generator (not shown) arranged to produce electrical energy distributed via an electrical cable integrated within or secured to the wire. In one example, the generator is speed controlled and in another example, the generator is not speed controlled. The electricity is distributed further from the mooring 4 via a distribution network.

The density of the vehicle 3 with its turbine 9, rod 10 and wire 6 is preferably somewhat lower than the density of water.

In FIG. 3 the wire 6 comprises two supporting twisted cables 11a, 11b for example made of a carbon fiber material and the electrical cable 12. The wire further comprises an additional electrical low voltage or optical cable 13 for data communication with the vehicle 3. The supporting cables 11a, 11b, electrical cable 12 and low voltage or optical cable 13 are enclosed in a cover 14, for example made of a rubber material or plastic.

The vehicle 3 is preferably powered only by the stream. However, in certain situations, for example when an error condition has appeared, the electrical generator can be used as an electrical engine powered by one or several batteries (not shown) mounted at the vehicle. Then, the generator/engine can drive the vehicle to the sea surface for transportation to a service site. This of course presumes that the vehicle first has been released from the wire. The generator can be used as an engine also for other purposes, for example for driving the vehicle to a parking location at the sea bottom.

Figure 4:
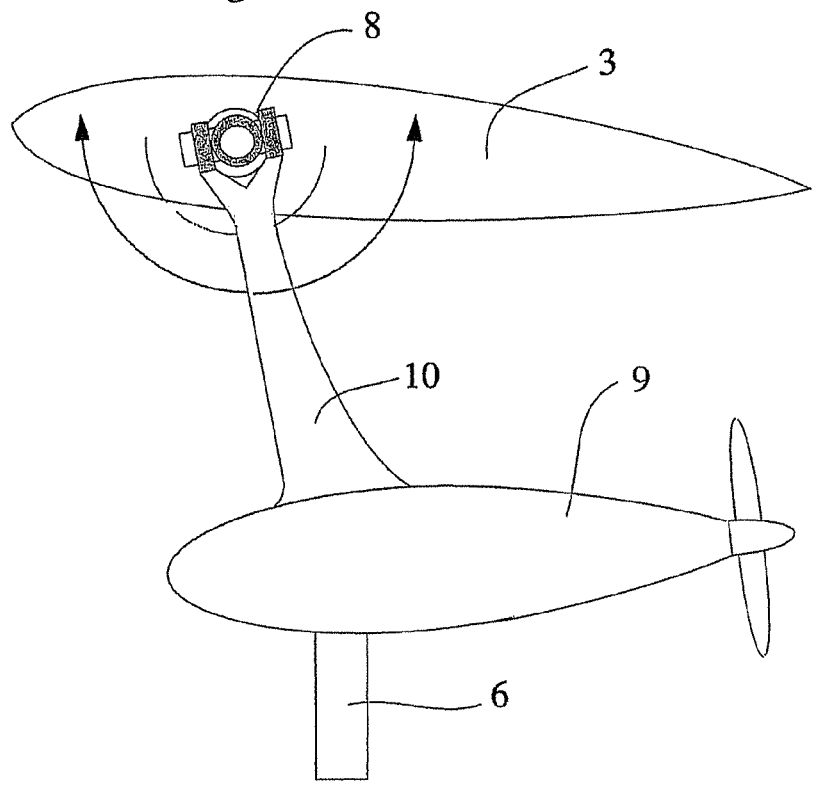
FIG. 4 shows an example of a mounting of a turbine to the vehicle of the submersible plant of FIG. 1.

In FIG. 4, the rod 10 is mounted to the vehicle 3 by means of a bearing arrangement 8 so that the vehicle is free swiveling at least in pitch direction but preferably also in roll direction. Preferably, the relationship between the turbine and the vehicle is fixed in yaw direction. The fact that the vehicle is free swiveling in relation to the turbine secures that the turbine arrangement always substantially faces the relative stream direction, ie the stream direction is perpendicular to a plane defined by the turbine blades. In FIG. 4, the bearing arrangement is a universal bearing. The universal bearing provides for the free swiveling feature in pitch and roll direction. In the example illustrated in FIG. 4, the turbine is fixedly mounted to the rod, or integrated therewith while the other end of the rod facing the vehicle is mounted to the vehicle by means of the bearing arrangement 8. However, in an alternative example (not shown) the bearing arrangement 8 is mounted at the end of the rod facing the turbine. In yet another example (not shown), the turbine is fixedly mounted to the rod or integrated therewith and the other end of the rod facing the vehicle is fixedly mounted to the vehicle or integrated therewith.

Figure 5:
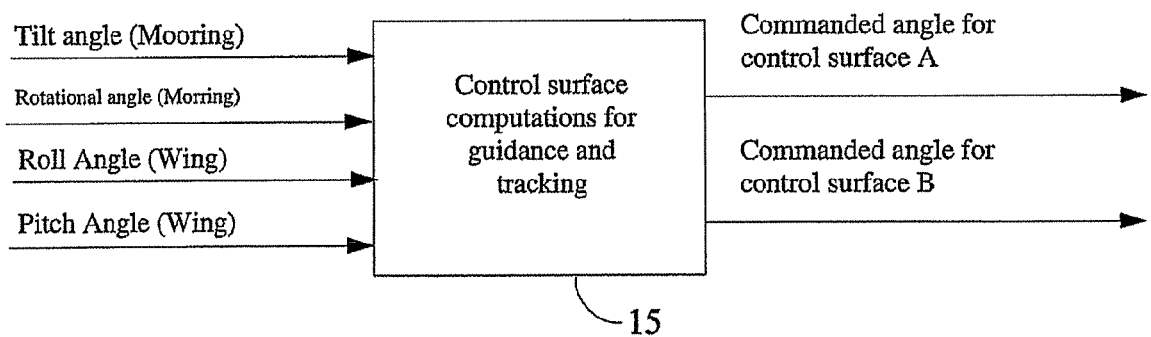
FIG. 5 shows an example of a control unit of the submersible plant of FIG. 1.

In FIG. 5, a control system 15 mounted on the vehicle is arranged to guide the vehicle in the predetermined trajectory 7 without exceeding the structural load limitations on the vehicle and turbine and electrical load limitations on the turbine. Other functional requirements of the control system 15 are to stabilize the vehicle 3 and optimize or control the power output of the device in the never-ending trajectory 7.

The control system 15 has in the shown example four input signals for guidance and tracking. The first input signal, namely current tilt angle $\alpha$ (see FIG. 1b), and the second input signal, namely current rotational angle $\beta$ (see FIG. 1c), are provided from angle detecting devices (not shown) mounted at the mooring 4 of the wire 6 and fed for example via the previously described electrical cable 13 in the wire 6 to the control system 15. The first, tilt angle signal $\alpha$ defines the angle between the wire 6 and the horizontal plane. The second, rotational angle signal $\beta$ defines the angle between the wire 6 and the horizontal stream direction. Two angle measuring arrangements are further mounted in the vehicle bearing arrangement 8. These two angle measuring devices are arranged to provide a third input signal to the control system indicating a roll angle between the vehicle 3 and rod 10 and to provide a fourth input signal indicating a pitch angle between the vehicle 3 and the rod 10. Further sensor data can for example be provided from an inertial measurement unit at the vehicle for refining the computations of the control system 15. The further sensor data can also relate to the water depth.

The tilt angle data $\alpha$, rotational angle data $\beta$, roll angle data and pitch angle data are processed by the control system and a command angle is outputted for a first control surface 16 (FIG. 2) of the vehicle 3 and a command angle for the second control surface 17 of the vehicle 3. In processing, values are calculated for pitch and yaw movements required by the vehicle in order to follow the predetermined trajectory. The control system then provides in a second step a command angle for each servo actuator (not shown) mounted on its corresponding control surface 16, 17. The hydrodynamic forces on the control surfaces then cause the vehicle and turbine to yaw and roll in order to follow the predetermined trajectory. The algorithms for calculating command angles for the first and second surfaces 16, 17 do not form part of the present invention. It would constitute normal operations to a person skilled in the art to provide an algorithm for guiding a vehicle in accordance with the above in a predetermined trajectory under given physical conditions. However, it can be said that the force and tension in the wire is very high when the vehicle operates in its trajectory. Accordingly, in determining the command angles for the control surfaces 16, 17, the wire 6 can be approximated as a linear rod.

Figure 6A:
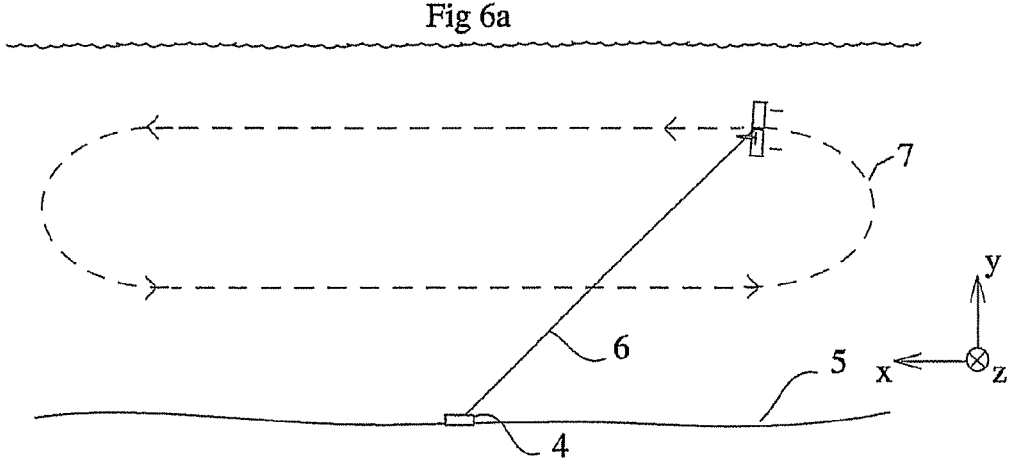
FIG. 6a shows an example of a submersible plant arrangement in accordance with a second example of the invention in a xy-plane, wherein x denotes a horizontal direction perpendicular to the stream direction and y denotes the vertical direction.
Figure 6B:
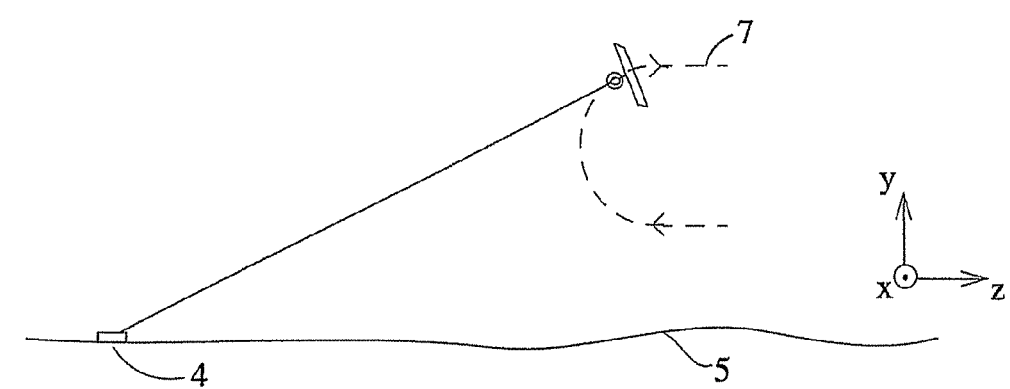
FIG. 6b shows the submersible plant arrangement of FIG. 6a in a yz-plane, wherein z denotes a horizontal stream direction.
Figure 6C:
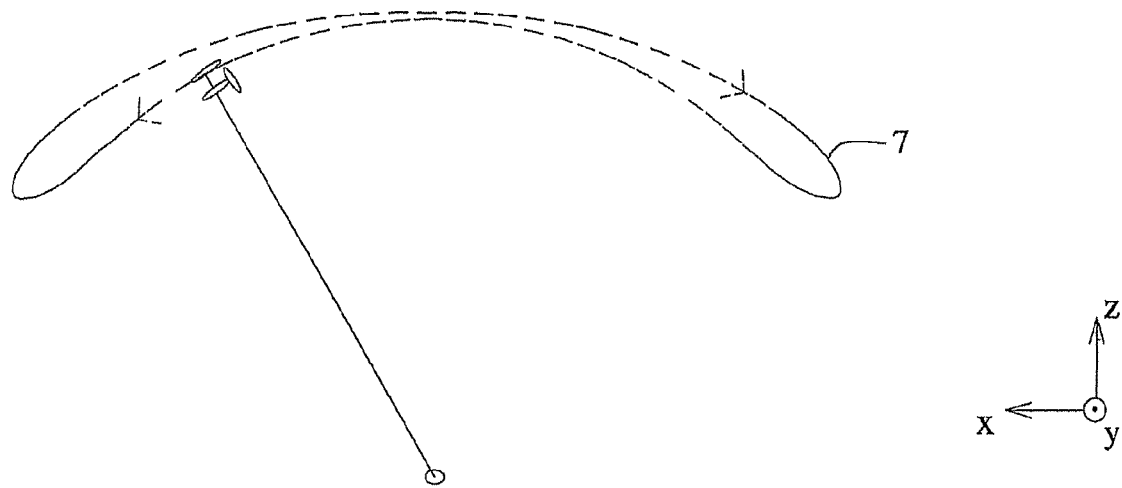
FIG. 6c shows the submersible plant arrangement of FIG. 6a in a xz-plane.

In FIGS. 6a, 6b, 6c, an example of an alternative never ending trajectory 7 of the vehicle 3 is shown in the same coordinate system as in FIG. 1. The trajectory illustrated in FIGS. 6a, 6b and 6c is formed as an oval. The illustrated never ending trajectory requires a swiveling device at the mooring 4 in order to avoid twisting the wire.

Figure 7:
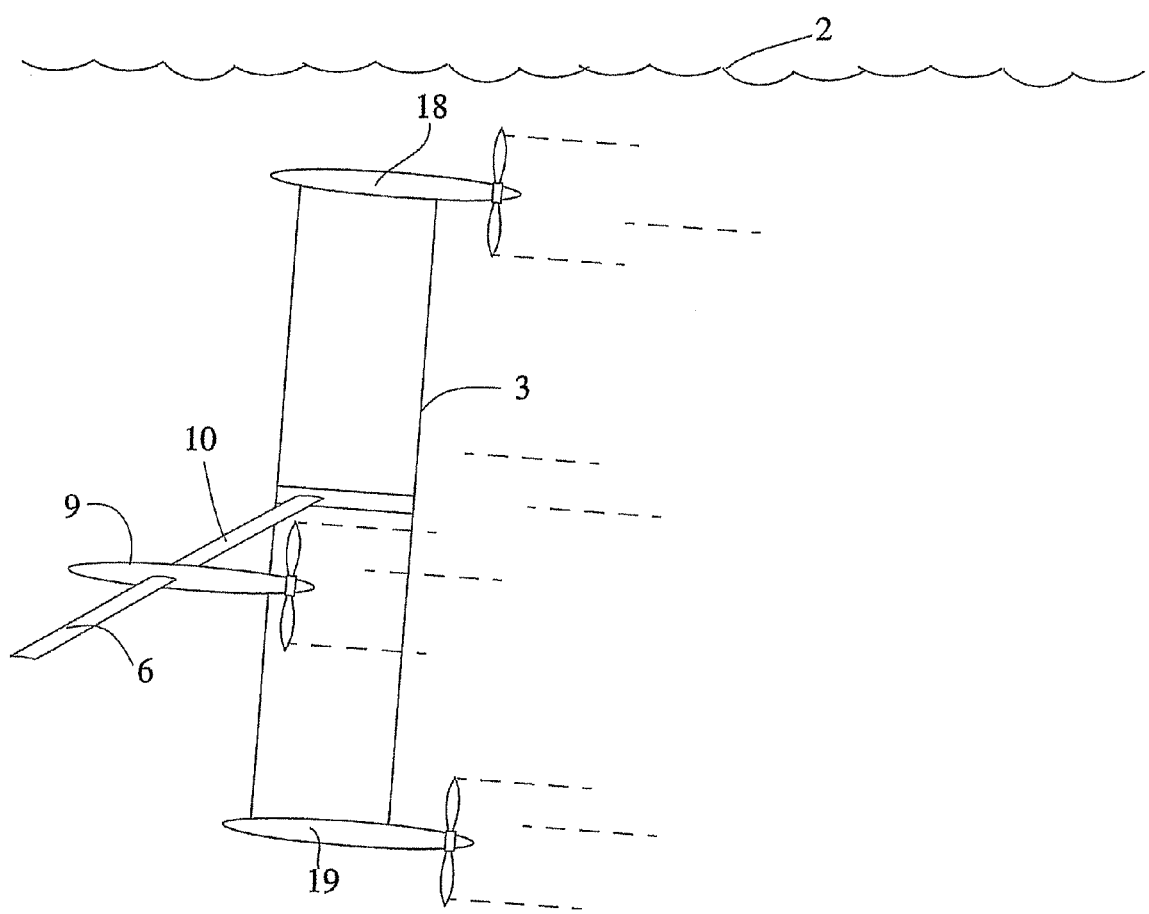
FIG. 7 shows a second example of a stream driven vehicle of the submersible plant of FIG. 1.

In FIG. 7 the vehicle is provided with two additional turbines 18, 19, one at each end of the vehicle. The turbines are mounted to the vehicle by means of a bearing allowing the turbines to be free swiveling in a pitch direction. An electrical generator arranged to produce electrical energy is connected to each turbine. A cable connects each additional turbine generator to the electrical cable 12 of the wire 6 for further distribution.

The vehicle is in the illustrated examples a wing. However, the invention is not limited to a vehicle in the form of a wing. For example, the vehicle can be formed by two or more wings arranged on top of each other and separated by means of spacer elements.

The invention claimed is:

1. A submersible plant for producing energy comprising: at least one turbine;
wherein:
said turbine is mounted on a stream-driven vehicle having at least one wing;
said stream-driven vehicle is secured in a structure by means of at least one wire;
said stream-driven vehicle is provided with steering means; and
a control unit is arranged to provide control signals to the steering means for steering the vehicle in a predetermined trajectory formed in a spherical surface at least partly crossing the stream-direction.

2. A submersible plant according to claim 1, wherein the vehicle is substantially free swiveling at least in a pitch direction in relation to each turbine.

3. A submersible plant according to claim 2, wherein the vehicle is substantially free swiveling in a roll direction in relation to at least one of the turbines.

4. A submersible plant according to claim 2, wherein at least one of the turbines is mounted on the vehicle via a rod, and in that a swivel coupling is mounted at one end of the rod for pivotally connecting either the turbine (9) or the vehicle to the rod.

5. A submersible plant according to claim 4, wherein the swivel coupling comprises a universal bearing.

6. A submersible plant according to claim 2, wherein at least one of the turbines is directly mounted on the vehicle by means of a swivel coupling.

7. A submersible plant according to claim 1, wherein said steering means includes at least one control surface.

8. A submersible plant according to claim 1, wherein the turbine is operatively connected to a generator arranged to produce electrical energy.

9. A submersible plant according to claim 8, wherein the generator is operatively connected to an electrical cable arranged to distribute said electrical energy.

10. A submersible plant according to claim 9, wherein said electrical cable is at least partly integrated in the wire.

11. A submersible plant according to claim 3, wherein at least one of the turbines is mounted on the vehicle via a rod, and in that a swivel coupling is mounted at one end of the rod for pivotally connecting either the turbine or the vehicle to the rod.

* * * * *